United States Patent
Kim et al.

(10) Patent No.: US 9,392,505 B2
(45) Date of Patent: Jul. 12, 2016

(54) METHOD FOR REPORTING INFORMATION ON MULTIBAND CAPABILITY TO NETWORK AT USER EQUIPMENT IN WIRELESS COMMUNICATION SYSTEM AND AN APPARATUS THEREFOR

(71) Applicant: LG ELECTRONICS INC., Seoul (KR)

(72) Inventors: Sangwon Kim, Anyang-si (KR); Youngdae Lee, Anyang-si (KR); Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 14/416,028

(22) PCT Filed: Oct. 18, 2013

(86) PCT No.: PCT/KR2013/009331
§ 371 (c)(1),
(2) Date: Jan. 20, 2015

(87) PCT Pub. No.: WO2014/069825
PCT Pub. Date: May 8, 2014

(65) Prior Publication Data
US 2015/0181475 A1 Jun. 25, 2015

Related U.S. Application Data

(60) Provisional application No. 61/721,440, filed on Nov. 1, 2012, provisional application No. 61/722,247, filed on Nov. 5, 2012.

(51) Int. Cl.
*H04W 36/00* (2009.01)

(52) U.S. Cl.
CPC ...... *H04W 36/0055* (2013.01); *H04W 36/0083* (2013.01)

(58) Field of Classification Search
USPC .................................................. 455/436–448
See application file for complete search history.

(56) References Cited

U.S. PATENT DOCUMENTS

2008/0268833 A1   10/2008   Huang et al.

FOREIGN PATENT DOCUMENTS

WO   2012-060655 A2   5/2012

OTHER PUBLICATIONS

3GPP TS 36.331 V8.5.0 (Mar. 2009), "3rd Generation Partnership Project; Technical Specification Group Radio Access Network; Evolved Universal Terrestrial Radio Access (E-UTRA) Radio Resource Control (RRC); Protocol Specification (Release 8)".
ETSI TS 122 011 V10.3.0 (Apr. 2011), "Digital cellular telecommunications system (Phase 2+); Universal Mobile Telecommunications System (UMTS); LTE Service accessibility (3GPP TS 22.011 version 10.3.0 Release 10)".

*Primary Examiner* — Joel Ajayi
(74) *Attorney, Agent, or Firm* — Dentons US LLP

(57) ABSTRACT

A method for processing a signal at a user equipment in a wireless communication system is disclosed. The method includes steps of receiving, from a source cell, a handover command including information on an operating band of a target cell; and if the carrier frequency of the target cell is not calculated using the information on the operating band of the target cell, configuring the target cell as a barred cell.

9 Claims, 9 Drawing Sheets

E-UMTS

FIG. 3
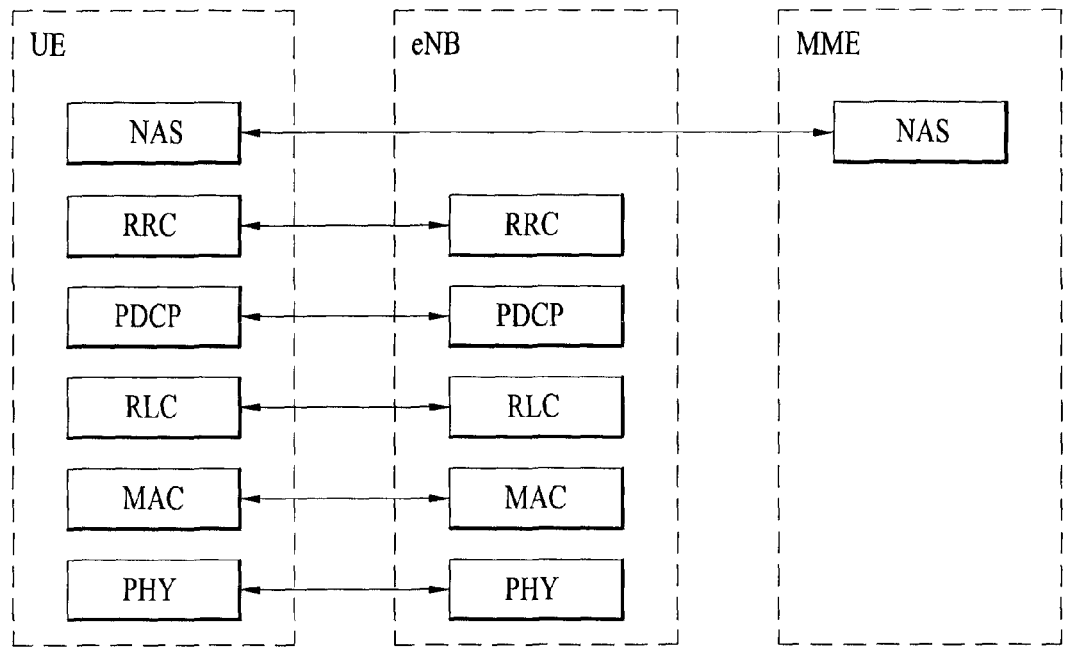
(a) contol - plane protocol stack
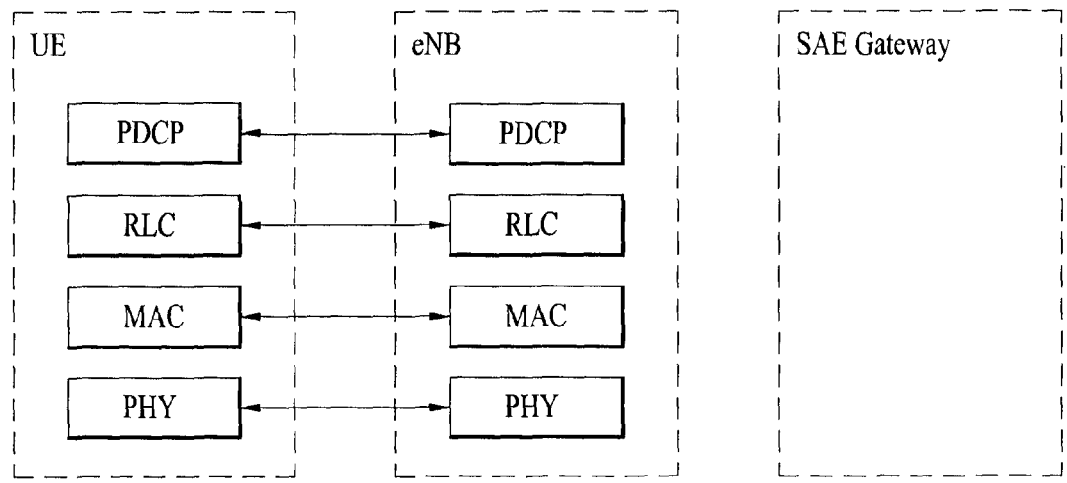
(b) user - plane protocol stack

METHOD FOR REPORTING INFORMATION ON MULTIBAND CAPABILITY TO NETWORK AT USER EQUIPMENT IN WIRELESS COMMUNICATION SYSTEM AND AN APPARATUS THEREFOR

This application is a 35 U.S.C. §371 National Stage Entry of International Application No. PCT/KR2013/009331 filed Oct. 18, 2013, which claims benefit of and priority to U.S. Provisional Application Nos. 61/721,440 filed Nov. 1, 2012 and 61/722,247 filed Nov. 5, 2012, all of which are incorporated by reference for all purposes as if fully set forth herein.

TECHNICAL FIELD

The present invention relates to a wireless communication system and, more particularly, to a method for reporting information on a multiband capability to a network at a user equipment in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARM)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for reporting information on the multiband capability to the network at the user equipment in the wireless communication system and an apparatus therefor.

Technical Solution

In accordance with an embodiment of the present invention, a method for processing a signal at a user equipment in a wireless communication system includes receiving, from a source cell, a handover command including information on an operating band of a target cell; and if the carrier frequency of the target cell is not calculated using the information on the operating band of the target cell, configuring the target cell as a barred cell.

Here, the carrier frequency of the target cell is a carrier frequency corresponding to the operating band of the target cell or to at least one overlapping band of the operating band of the target cell.

Preferably, the method may further comprise, if the carrier frequency of the target cell is calculated using the information on the operating band of the target cell, performing a handover procedure to the target cell.

Preferably, the method may further comprise performing a connection reestablishment procedure with a network, if the carrier frequency of the target cell is not calculated using the information on the operating band of the target cell. Here, performing the connection reestablishment procedure may comprise performing a cell selecting procedure to select other cell; receiving system information including information on an operating band of the other cell; and if a carrier frequency of the other cell is calculated using the information on the operating band of the other cell, performing a handover procedure to the other cell. Of course, the carrier frequency of the other cell is a carrier frequency corresponding to the band of the other cell or to at least one overlapping band of the operating band of the other cell.

More preferably, the information on the operating band of the target cell is an EARFCN (Evolved Universal Terrestrial Radio Access Absolute Radio Frequency Channel Number) of the target cell or the other cell.

According to other embodiment of the present application, a method for processing a signal at a user equipment in a wireless communication system comprises transmitting information on capability of the user equipment to a network, wherein the information on the capability of the user equipment includes a supporting band and at least one overlapping band of the supporting band.

Preferably, the information on the capability of the user equipment can include information on a lastly defined band of the supporting band and the at least one overlapping band of the supporting band.

It is to be understood that both the foregoing general description and the following detailed description of the present invention are exemplary and explanatory and are intended to provide further explanation of the invention as claimed.

Advantageous Effects

According to embodiments of the present invention, the user equipment can efficiently report information on a multi-band capability to the network in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 3(a) and (b) are diagrams showing a control plane and a user plane of a radio interface protocol between a UE and an E-UTRAN based on a 3rd generation partnership project (3GPP) radio access network standard.

BEST MODE

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
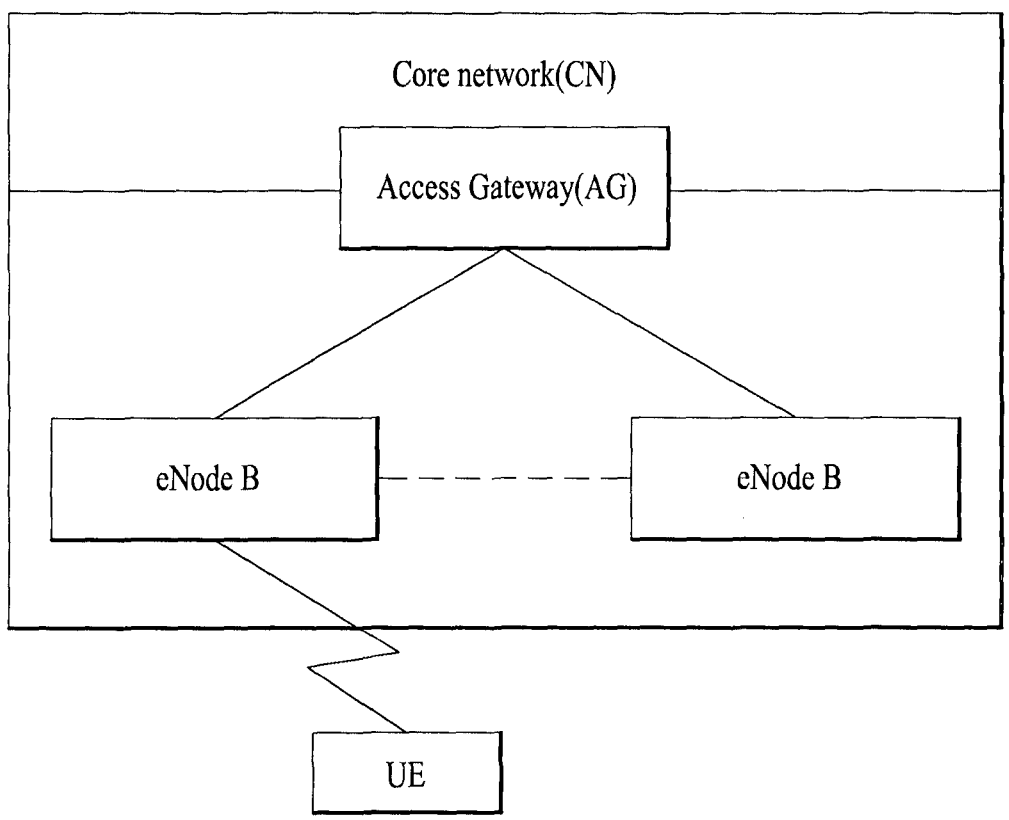
FIG. 1 is a diagram showing a network structure of an Evolved Universal Mobile Telecommunications System (E-UMTS) as an example of a wireless communication system.
Figure 2:
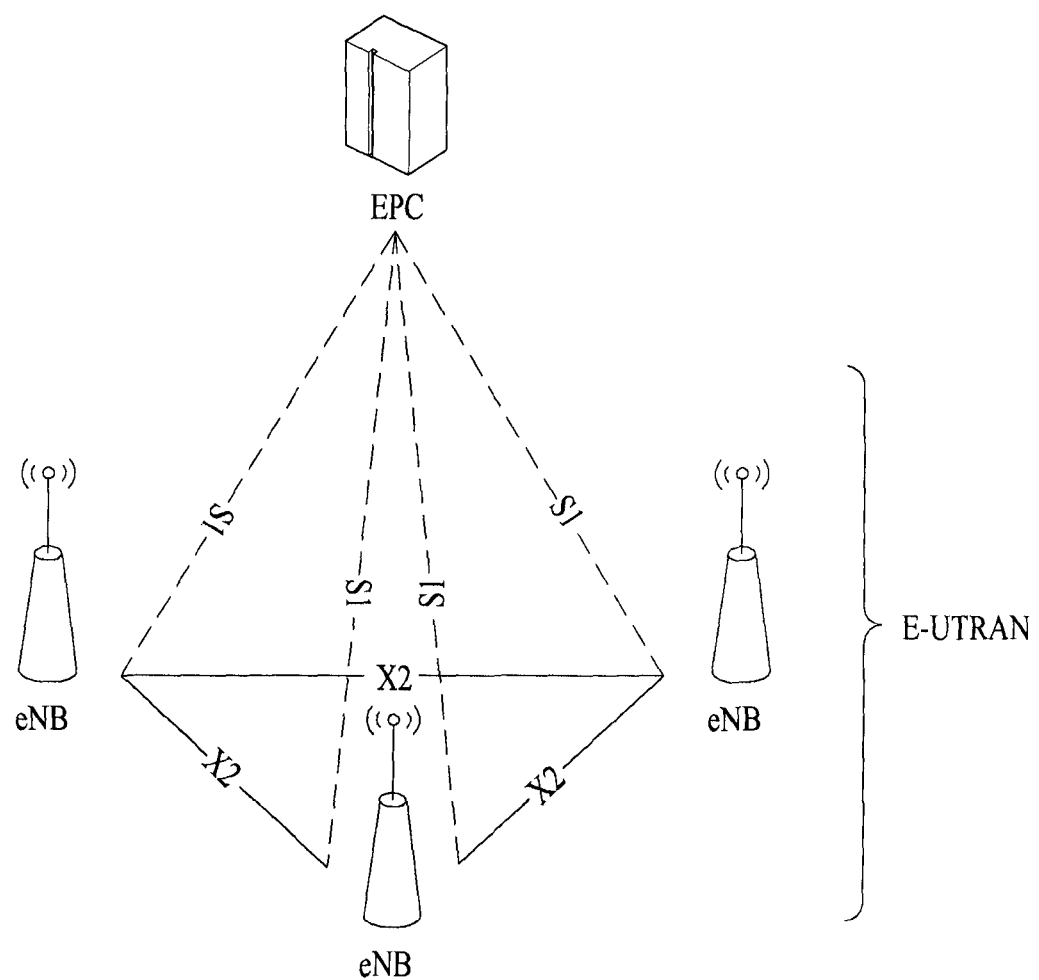
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH)

for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
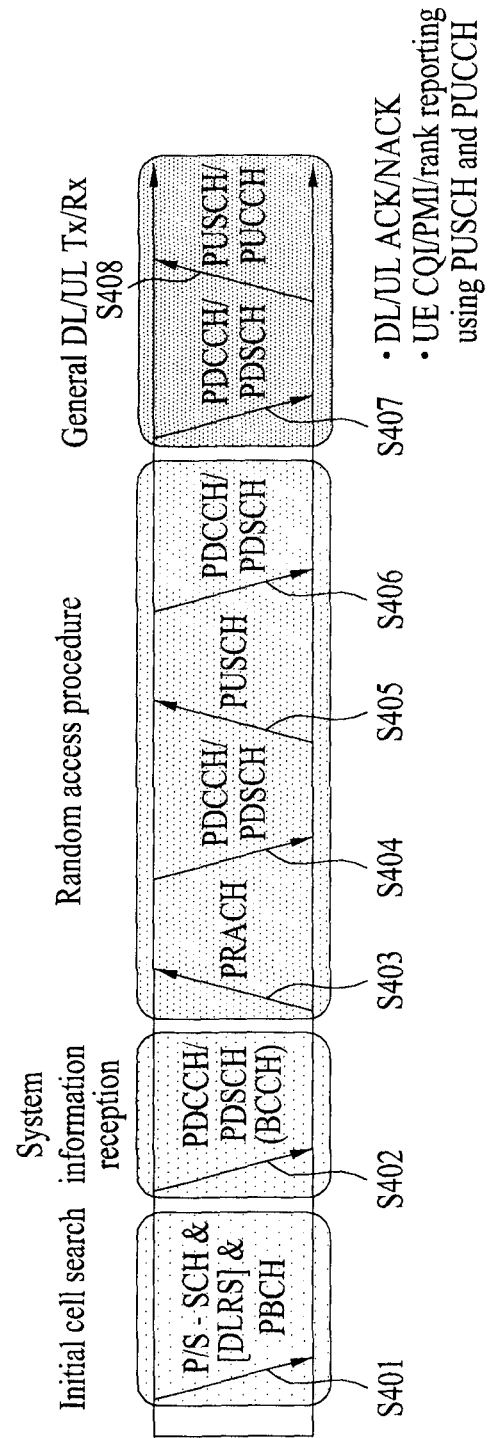
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
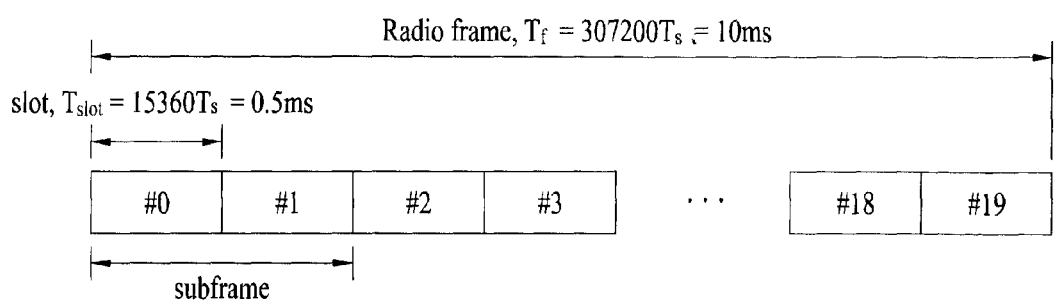
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360λTs). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Hereinafter, an RRC state of a UE and an RRC connection method will be described.

The RRC state indicates whether the RRC layer of the UE is logically connected to the RRC layer of the E-UTRAN. When the RRC connection is established, the UE is in a RRC_CONNECTED state. Otherwise, the UE is in a RRC_IDLE state.

The E-UTRAN can effectively control UEs because it can check the presence of RRC_CONNECTED UEs on a cell basis. On the other hand, the E-UTRAN cannot check the presence of RRC_IDLE UEs on a cell basis and thus a CN manages RRC_IDLE UEs on a TA basis. A TA is an area unit larger than a cell. That is, in order to receive a service such as a voice service or a data service from a cell, the UE needs to transition to the RRC_CONNECTED state.

In particular, when a user initially turns a UE on, the UE first searches for an appropriate cell and camps on the cell in the RRC_IDLE state. The RRC_IDLE UE transitions to the RRC_CONNECTED state by performing an RRC connection establishment procedure only when the RRC_IDLE UE needs to establish an RRC connection. For example, when uplink data transmission is necessary due to call connection attempt of a user or when a response message is transmitted in response to a paging message received from the E-UTRAN, the RRC_IDLE UE needs to be RRC connected to the E-UTRAN.

Figure 6:
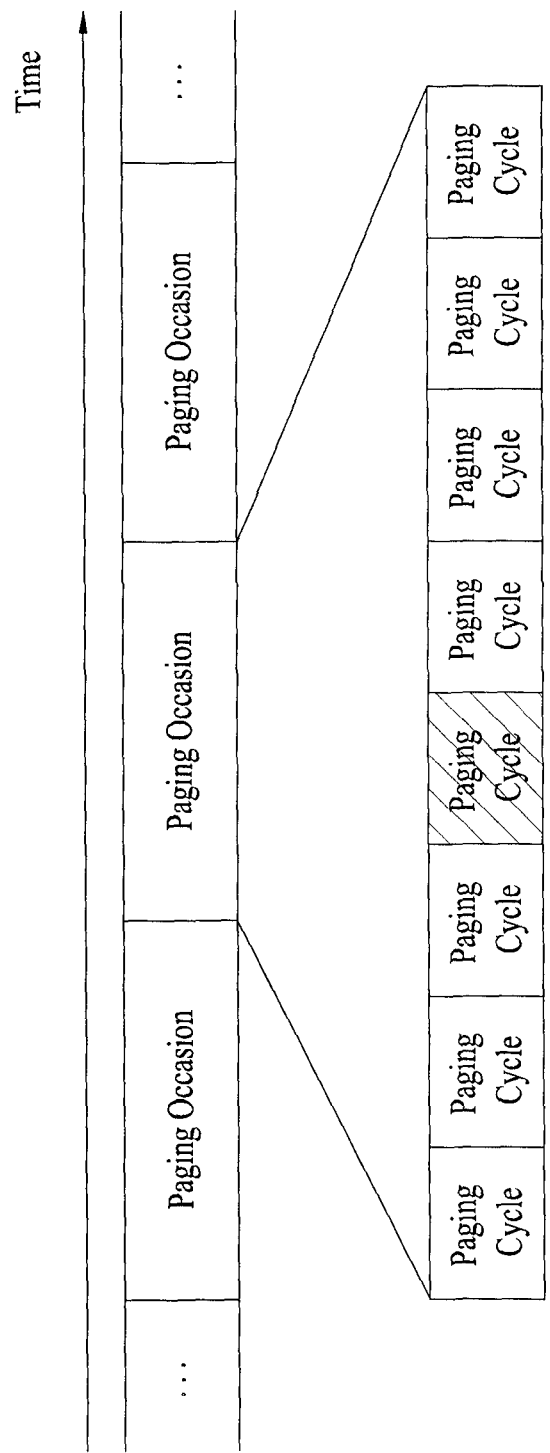
FIG. 6 is a diagram showing a general transmission and reception method using a paging message.

FIG. 6 is a diagram showing a general transmission and reception method using a paging message.

Referring to FIG. 6, the paging message includes a paging record having paging cause and UE identity. Upon receiving the paging message, the UE may perform a discontinuous reception (DRX) operation in order to reduce power consumption.

In detail, a network configures a plurality of paging occasions (POs) in every time cycle called a paging DRC cycle and a specific UE receives only a specific paging occasion and acquires a paging message. The UE does not receive a paging channel in paging occasions other than the specific paging occasion and may be in a sleep state in order to reduce power consumption. One paging occasion corresponds to one TTI.

The eNB and the UE use a paging indicator (PI) as a specific value indicating transmission of a paging message. The eNB may define a specific identity (e.g., paging—radio network temporary identity (P-RNTI)) as the PI and inform the UE of paging information transmission. For example, the UE wakes up in every DRX cycle and receives a subframe to determine the presence of a paging message directed thereto. In the presence of the P-RNTI on an L1/L2 control channel (a PDCCH) in the received subframe, the UE is aware that a paging message exists on a PDSCH of the subframe. When the paging message includes an ID of the UE (e.g., an international mobile subscriber identity (IMSI)), the UE receives a service by responding to the eNB (e.g., establishing an RRC connection or receiving system information).

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

Figure 7:
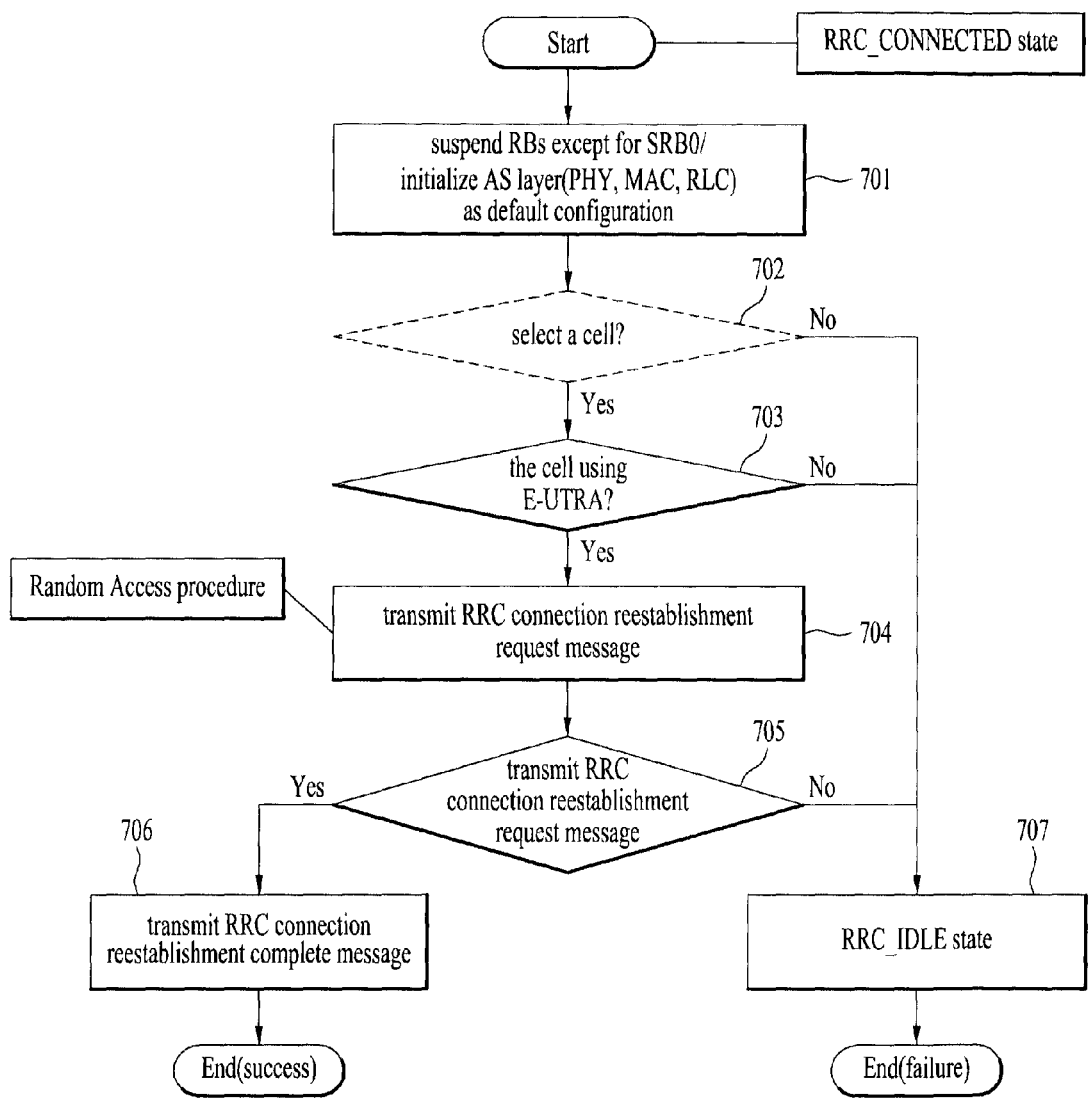
FIG. 7 illustrates a conventional RRC connection reestablishment procedure.

In following description, the RRC connection reestablishment procedure is explained concretely. FIG. 7 illustrates a conventional RRC connection reestablishment procedure.

As shown in FIG. 7, the UE may suspend every radio bearer except for SRB 0 (Signaling Radio Bearer #0), and may initialize several sub-layers of AS (Access Stratum). Then, the UE may set each sub-layer and PHY layer as default configuration. In this point, it is important that the UE maintains the RRC_CONNECTED state. (S701)

Further, the UE may perform the cell selection process for RRC connection reestablishment procedure. (S702) The conventional cell selection process for RRC connection reestablishment procedure is equal with the cell selection process performed by the UE in RRC_IDLE state.

If the UE determines a cell selected through the cell selection process for the RRC connection reestablishment procedure as a cell using the E-UTRA (S703), the UE may transmit the RRC connection reestablishment request message to the selected cell. (S704)

On the other hand, if the UE determines a cell selected as a cell using the RAT other than the E-UTRA (S703), the UE may suspend the RRC connection reestablishment procedure, and then leave from the RRC_CONNECTED state to the RRC_IDLE state. (S707) Further, if the UE does not select a cell until the cell selection timer is expired, the UE may determine the RRC connection reestablishment procedure as a failure, and then leave from the RRC_CONNECTED state to the RRC_IDLE state.

Figure 8:
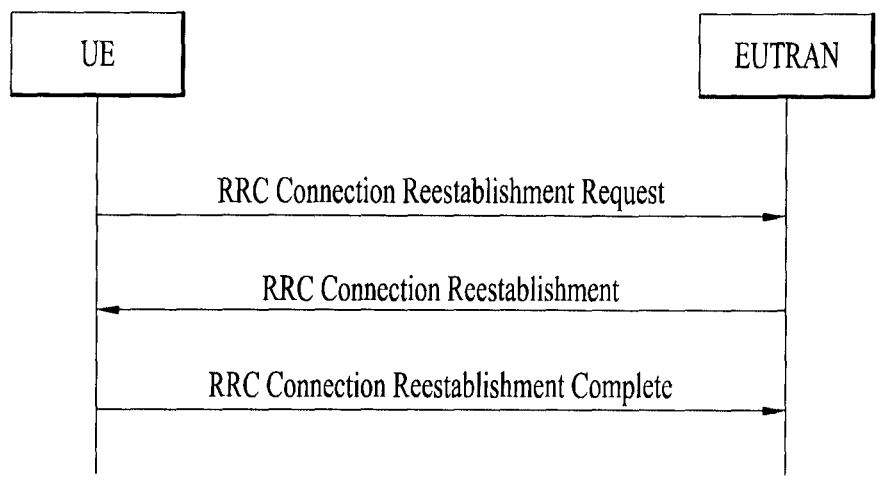
FIG. 8 illustrates the case that the RRC connection reestablishment procedure is completed successfully.

If the cell accept the RRC connection reestablishment request, the cell transmits a RRC connection reestablishment accept message to the UE. (S705) The UE received the RRC connection reestablishment accept message may reestablish a PDCP sub-layer and a RLC sub-layer about SRB 1. Then, the UE may recalculate several key values, and may reconfigure the key values into the PDCP sub-layer about a security. As a consequently, SRB 1 between the UE and the cell may develop, and then the UE can communicate RRC control messages. Then the UE may complete redevelopment of the SRB 1, and transmit a RRC connection reestablishment complete message. FIG. 8 illustrates the case that the RRC connection reestablishment procedure is completed successfully, such as S704, S705 and S706.

Therefore, after the RRC connection reestablishment procedure is completed successfully, the UE may perform a RRC connection reconfiguration procedure. Then, the UE can recover a condition which was set before performing the RRC connection reestablishment procedure, and the continuity of the service is ensured.

Figure 9:
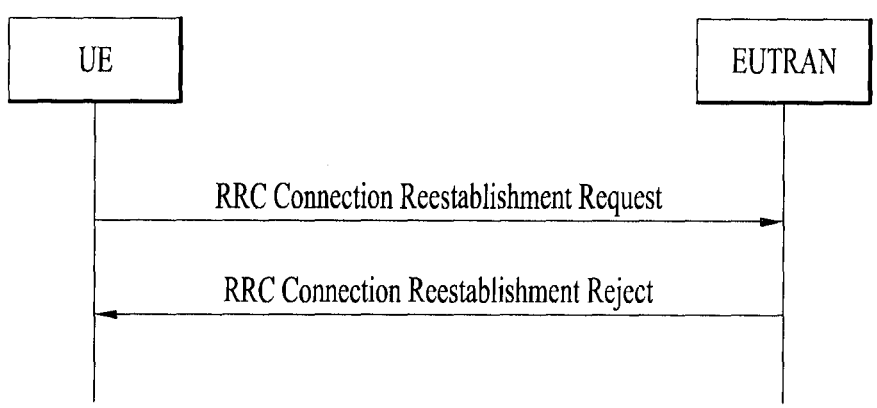
FIG. 9 illustrates the case that the RRC connection reestablishment procedure fails.

On the other hand, if the cell rejects the RRC connection reestablishment request, the cell transmits a RRC connection reestablishment reject message to the UE. The UE received the RRC connection reestablishment reject message may release the RRC_CONNECTED state and be switched to the RRC_IDLE state. FIG. 9 illustrates the case that the RRC connection reestablishment procedure fails.

After the UE leaves from the RRC_CONNECTED state to the RRC_IDLE state, the RRC of the UE may release all using radio resources, which is tall RLC entities, MAC configuration, and PDCP entities, and informs a disconnection of the RRC connection for the NAS of the UE. Further, the AS of the UE may perform the initial cell selection process for the UE in the RRC_IDLE state.

On the other hand, in 3GPP TS 36.304, services that E-UTRAN provides the UE are divided into three categories such as following table 1.

TABLE 1

| | |
|---|---|
| Limited service | Emergency call and ETWS (Earthquake and Tsunami Warning System) are provided. |
| Normal service | Normal services for public use are provided. |
| Operator service | Services for operators only are provided. |

Further, in 3GPP TS 36.304, a cell type is defined according to the services that E-UTRAN provides the UE, such as following table 2.

TABLE 2

| | |
|---|---|
| Acceptable cell | A cell provides the UE with the limited service only. |
| Suitable cell | A cell provides the UE with the normal service. |
| Barred cell | A cell is barred if it is so indicated in the system information. |
| Reserved cell | A cell is reserved if it is so indicated in system information. |

In table 2, the acceptable cell is a cell which is not barred and fulfills the cell selection criterion, which provides the UE with Limited service such as emergency call and ETWS.

Further, the suitable cell is a cell which fulfills conditions of the acceptable cell and additional conditions. The additional conditions are that the cell is belonging to PLMN (Public Land Mobile Network) which the UE can connect, and that is not forbidden performing TA update procedure. If the cell is CSG (Closed Subscriber Group) cell, the UE can connect the cell as a CSG member.

The following description relates to E-UTRA operation band and multiple bands.

Multiple E-UTRA operation bands are defined as shown in Table 3.

TABLE 3

| E-UTRA Operating Band | Uplink (UL) operating band BS receive UE transmit $F_{UL\_low}$-$F_{UL\_high}$ | | Downlink (DL) operating band BS transmit E receive $F_{DL\_low}$-$F_{DL\_high}$ | | Duplex Mode |
|---|---|---|---|---|---|
| 1 | 1920 MHz | 1980 MHz | 2110 MHz | 2170 MHz | FDD |
| 2 | 1850 MHz | 1910 MHz | 1930 MHz | 1990 MHz | FDD |
| 3 | 1710 MHz | 1785 MHz | 1805 MHz | 1880 MHz | FDD |
| 4 | 1710 MHz | 1755 MHz | 2110 MHz | 2155 MHz | FDD |

TABLE 3-continued

| E-UTRA Operating Band | Uplink (UL) operating band BS receive UE transmit $F_{UL\_low}$-$F_{UL\_high}$ | | Downlink (DL) operating band BS transmit E receive $F_{DL\_low}$-$F_{DL\_high}$ | | Duplex Mode |
|---|---|---|---|---|---|
| 5 | 824 MHz | 849 MHz | 869 MHz | 894 MHz | FDD |
| 6[1] | 830 MHz | 840 MHz | 875 MHz | 885 MHz | FDD |
| 7 | 2500 MHz | 2570 MHz | 2620 MHz | 2690 MHz | FDD |
| 8 | 880 MHz | 915 MHz | 925 MHz | 960 MHz | FDD |
| 9 | 1749.9 MHz | 1784.9 MHz | 1844.9 MHz | 1879.9 MHz | FDD |
| 10 | 1710 MHz | 1770 MHz | 2110 MHz | 2170 MHz | FDD |
| 11 | 1427.9 MHz | 1447.9 MHz | 1475.9 MHz | 1495.9 MHz | FDD |
| 12 | 699 MHz | 716 MHz | 729 MHz | 746 MHz | FDD |
| 13 | 777 MHz | 787 MHz | 746 MHz | 756 MHz | FDD |
| 14 | 788 MHz | 798 MHz | 758 MHz | 768 MHz | FDD |
| 15 | Reserved | | Reserved | | FDD |
| 16 | Reserved | | Reserved | | FDD |
| 17 | 704 MHz | 716 MHz | 734 MHz | 746 MHz | FDD |
| 18 | 815 MHz | 830 MHz | 860 MHz | 875 MHz | FDD |
| 19 | 830 MHz | 845 MHz | 875 MHz | 890 MHz | FDD |
| 20 | 832 MHz | 862 MHz | 791 MHz | 821 MHz | FDD |
| 21 | 1447.9 MHz | 1462.9 MHz | 1495.9 MHz | 1510.9 MHz | FDD |
| 22 | 3410 MHz | 3490 MHz | 3510 MHz | 3590 MHz | FDD |
| 23 | 2000 MHz | 2020 MHz | 2180 MHz | 2200 MHz | FDD |
| 24 | 1626.5 MHz | 1660.5 MHz | 1525 MHz | 1559 MHz | FDD |
| 25 | 1850 MHz | 1915 MHz | 1930 MHz | 1995 MHz | FDD |
| 26 | 814 MHz | 849 MHz | 859 MHz | 894 MHz | FDD |
| 27 | 807 MHz | 824 MHz | 852 MHz | 869 MHz | FDD |
| 28 | 703 MHz | 748 MHz | 758 MHz | 803 MHz | FDD |
| 29 | N/A | | 717 MHz | 728 MHz | FDD[2] |
| 30 | 2305 MHz | 2315 MHz | 2350 MHz | 2360 MHz | FDD |
| 31 | 452.5 MHz | 457.5 MHz | 462.5 MHz | 467.5 MHz | FDD |
| ... | | | | | |
| 33 | 1900 MHz | 1920 MHz | 1900 MHz | 1920 MHz | TDD |
| 34 | 2010 MHz | 2025 MHz | 2010 MHz | 2025 MHz | TDD |
| 35 | 1850 MHz | 1910 MHz | 1850 MHz | 1910 MHz | TDD |
| 36 | 1930 MHz | 1990 MHz | 1930 MHz | 1990 MHz | TDD |
| 37 | 1910 MHz | 1930 MHz | 1910 MHz | 1930 MHz | TDD |
| 38 | 2570 MHz | 2620 MHz | 2570 MHz | 2620 MHz | TDD |
| 39 | 1880 MHz | 1920 MHz | 1880 MHz | 1920 MHz | TDD |
| 40 | 2300 MHz | 2400 MHz | 2300 MHz | 2400 MHz | TDD |
| 41 | 2496 MHz | 2690 MHz | 2496 MHz | 2690 MHz | TDD |
| 42 | 3400 MHz | 3600 MHz | 3400 MHz | 3600 MHz | TDD |
| 43 | 3600 MHz | 3800 MHz | 3600 MHz | 3800 MHz | TDD |
| 44 | 703 MHz | 803 MHz | 703 MHz | 803 MHz | TDD |

Bands configured to use overlap frequency bands are present in E-UTRA operation bands shown in Table 3. The above bands are referred to as overlap bands, and overlap bands of individual E-UTRA bands are shown in the following Table 4.

TABLE 4

| E-UTRA Operating Band | Overlapping E-UTRA operating bands | Duplex Mode |
|---|---|---|
| 2 | 25 | FDD |
| 3 | 9 | FDD |
| 4 | 10 | FDD |
| 5 | 18, 19, 26 | FDD |
| 9 | 3 | FDD |
| 10 | 4 | FDD |
| 12 | 17 | FDD |
| 17 | 12 | FDD |
| 18 | 5, 26, 27 | FDD |
| 19 | 5, 26 | FDD |
| 25 | 2 | FDD |
| 26 | 5, 18, 19, 27 | FDD |
| 27 | 18, 26 | FDD |
| 33 | 39 | TDD |
| 38 | 41 | TDD |
| 39 | 33 | TDD |
| 41 | 38 | TDD |

A cell may inform a UE of its own operation band using the freqBandIndicator and multiBandInfoList fields of the system information block 1 (SIB1). If the operation band of a cell is not supported by the UE, the corresponding cell is considered a barred cell.

Differently from the related art in which the cell informs the UE of only one operation band through system information, the cell informs the UE of its own operation band and overlap bands of the operation band under the multi-band environment. Therefore, the UE supporting multiple bands can attempt to access not only a band supported by the UE, but also a cell operated by an overlap band of the supporting band.

The UE can confirm an operation band of the cell and multiple overlap bands corresponding to the operation band through receiving system information of the selected cell. Assuming that a band supported by the UE is not present from among the operation band of the cell and multiple overlap bands, the UE may consider the corresponding cell as a barred cell.

The following description relates to an EARFCN (E-UTRA (Evolved Universal Terrestrial Radio Access) Absolute Radio Frequency Channel Number). UL and DL carrier frequencies of E-UTRA are denoted by EARFCN.

The relationship between the EARFCN and a DL carrier frequency is denoted by the following equation 1.

$$F_{DL}=F_{DL\_low}+0.1(N_{DL}-N_{Offs-DL})$$ [Equation 1]

In Equation 1, $N_{DL}$ is a DL EARFCN value, and $F_{DL\_low}$ and $N_{Offs-DL}$ values are shown in the following Table 5.

The relationship between the EARFCN and the UL carrier frequency is denoted by the following equation 2. Likewise, $N_{UL}$ is a UL EARFCN value, and $F_{UL\_low}$ and $N_{Offs-UL}$ values are shown in the following Table 5.

$$F_{UL}=F_{UL\_low}+0.1(N_{UL}-N_{Offs-UL})$$ [Equation 2]

band. In other words, the EARFCN value corresponding to each supported overlap band is not transferred to the UE.

When the network determines a UE handover supporting multiple bands, a cell operated by a support band of the UE or a cell operated by a band corresponding to the overlap band is referred to as a target cell.

After the UE supporting the overlap band obtains information regarding calculation of the carrier frequency from the EARFCN of the overlap bands, i.e., after the UE has been released to the market, a new overlap band can be created. The UE may not calculate the carrier frequency from the

TABLE 5

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 6001199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28 | 758 | 9210 | 9210-9659 | 703 | 27210 | 27210-27659 |
| 29[2] | 717 | 9660 | 9660-9769 | | N/A | |
| 30 | 2350 | 9770 | 9770-9869 | 2305 | 27660 | 27660-27759 |
| 31 | 462.5 | 9870 | 9870-9919 | 452.5 | 27760 | 27760-27809 |
| ... | | | | | | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |

Referring to Table 5, different offsets are given according to individual operation bands, and the same carrier frequencies have different EARFCN values according to bands. In other words, different EARFCNs are used when the same carrier frequency is displayed among overlap bands employing the same frequency band.

The UE supporting the overlap bands can calculate not only a band supported by the UE but also a carrier frequency from EARFCN of all overlap bands. That is, since the UE has already recognized $F_{UL\_low}$ and $N_{Offs-UL}$ values of the overlap bands, when the cell may inform UEs of its own UL frequency through system information, the cell may inform UEs of only the EARFCN value corresponding to the operation EARFCN of the new overlap band. If the UE supporting the overlap band is handed over to a cell operating as a new overlap band, it is impossible to calculate an uplink (UL) carrier frequency on the basis of system information of a target cell.

However, UE operations for use in the above-mentioned case are not defined in the current standard. Accordingly, the UE is unable to recognize a UL carrier frequency, such that connection to the corresponding cell can be maintained although UL transmission is impossible.

In conclusion, the UE supporting the overlap band must not be handed over to the cell of the overlap band incapable of calculating EARFCN. If such handover occurs, it is necessary for the UE to move to a supportable band or a cell of another band overlapping the supportable band.

The present invention proposes the following method for preventing the UE from being handed over to a cell in which the UE is unable to recognize the UL carrier frequency.

<First Embodiment>

The UE may inform the network of EARFCN capability information indicating which E-UTRA operation band can calculate the carrier frequency on the basis of EARFCN.

Although the UE does not support the EARFCN capability information, the EARFCN capability information may include information regarding a band identifier (ID) of each band (serving as an overlap band of a supported operation band) in which the carrier frequency can be calculated from EARFCN.

In addition, the EARFCN capability information may include a band ID of the latest defined band from among overlap bands in which the UE can calculate the carrier frequency on the basis of EARFCN.

The network having received the EARFCN capability information can determine that the UE may calculate the carrier frequency from EARFCN in association with all overlap bands defined before a specific overlap band designated by the UE.

For example, the UE supports the band A and the band H, and overlap bands of individual support bands and definition times of the overlap bands are shown in the following Table 6. As the band ID of the band has a higher order, it is assumed that the corresponding band is defined at a later time.

TABLE 6

| Support Band | Overlap band | |
|---|---|---|
| | Defined before UE releasing | Defined after UE releasing |
| Band A | B, C, D | E |
| Band H | I | J |

The UE has been released before definition of Band E and Band J, and the UE can calculate the carrier frequency from EARFCN in association with Bands (A, B, C, D, H, I). However, although Band E is an overlap band of Band A and Band J is an overlap band of Band H, information regarding the overlap band of the UE indicates the band to be defined later, such that it is impossible for the UE to recognize the EARFCN value of each of BAND E and BAND J. Accordingly, the UE transmits one EARFCN capability information from among the following two types to the network.

1) EARFCN capability information types 1: B, C, D, I
2) EARFCN capability information types 2: D, I Although the network having received the EARFCN capability information determines that the UE can connect not only to the support bands (A, H) but also to overlap bands (B, C, D, I) of the support bands (A, H), the network determines that the UE cannot connect to Band E and Band J. Accordingly, the corresponding UE is not handed over to the cell operating in Band E and Band J.

<Second Embodiment>

In accordance with the second embodiment, if the UE is handed over to the cell in which it is impossible to recognize the UL carrier frequency, or if the UE is handed over the cell to which the UE cannot connect, a cell re-selection method using the following RRC connection re-establishment procedure is proposed in such a manner that the UE can move to a cell of a supportable band.

If the UE cannot calculate the UL carrier frequency of the serving cell after completion of handover, the UE may perform the RRC connection reestablishment procedure. In this case, the UE operations are as follows as shown in FIG. 10.

Figure 10:
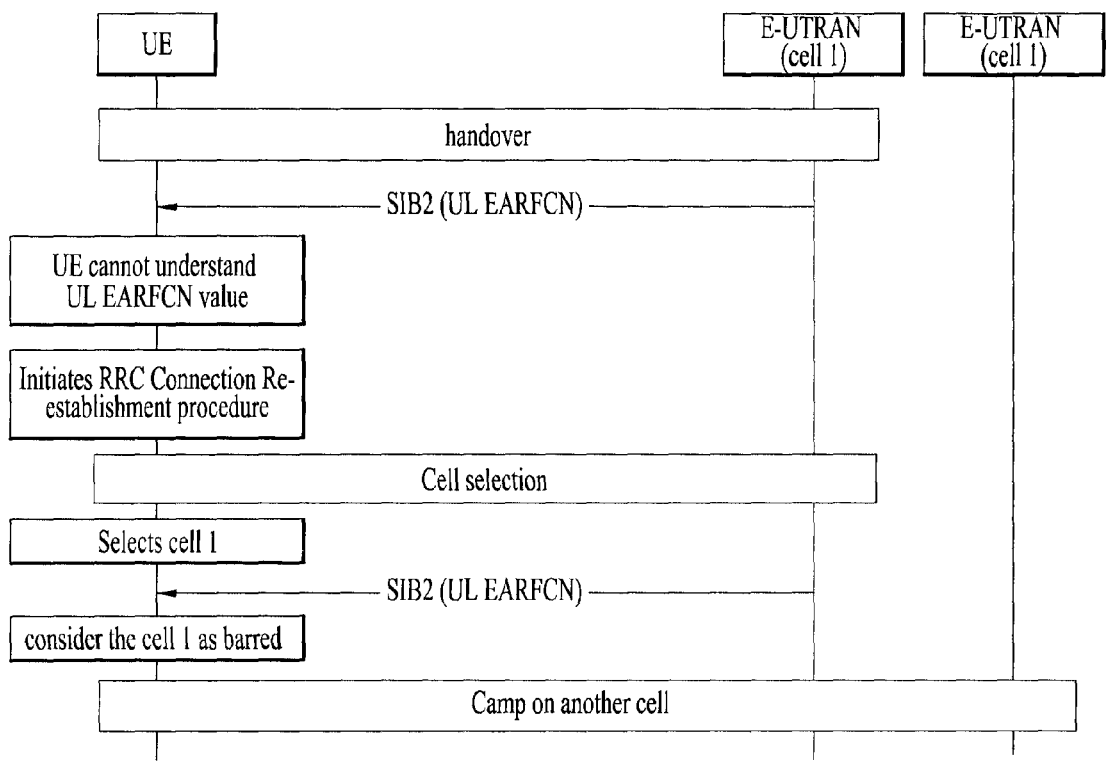
FIG. 10 is a conceptual diagram illustrating UE operations according to a second embodiment of the present invention.

FIG. 10 is a conceptual diagram illustrating the UE operations according to a second embodiment of the present invention.

A) First, the UE receives a handover (HO) command message including UL and DL carrier frequencies from the network (especially, from a source cell to a target cell (Cell 1) of FIG. 10), and calculates the carrier frequency of the target cell using the received EARFCN. Assuming that the carrier frequency of the target cell can be calculated using the received EARFCN, the UE may be continuously handed over to the selected cell.

B) However, assuming that it is impossible to calculate the carrier frequency of Cell 1 serving as a target cell using the received EARFCN, the UE may start the RRC connection reestablishment procedure.

In more detail, the cell selection procedure is re-performed, a system information block 2 (SIB2) including EARFCN is received from the selected cell, and the UL carrier frequency is calculated from the EARFCN.

However, assuming that the last RRC-connected cell (i.e., Cell 1 of FIG. 10) is re-selected, this means an EARFCN incapable of calculating the carrier frequency through SIB2, such that Cell 1 is considered a barred cell. Thereafter, the UE moves to a cell (i.e., Cell 2 of FIG. 10) of a band capable of calculating EARFCN.

As is apparent from the above description, the UE supporting the overlap band can inform the network of the list of overlap bands in which EARFCN can be calculated, such that the UE is prevented from being handed over to the band in which EARFCN cannot be calculated. In addition, assuming that the UE is handed over to the band in which EARFCN cannot be calculated, the UE performs the RRC connection re-establishment procedure, such that the UE move to a cell of the band in which EARFCN can be calculated.

Figure 11:
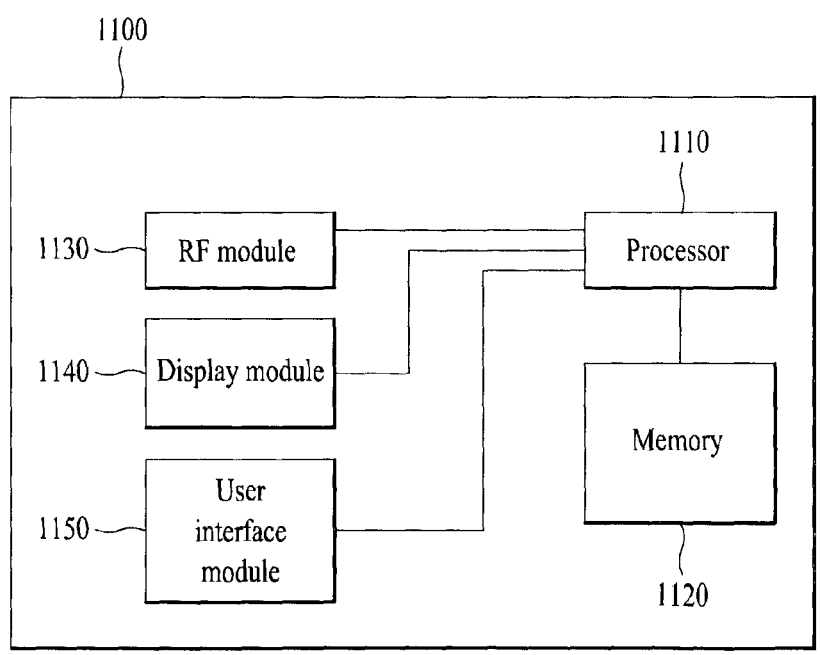
FIG. 11 is a block diagram of a communication apparatus according to an embodiment of the present invention.

FIG. 11 is a block diagram illustrating a communication apparatus in accordance with an embodiment of the present invention.

Referring to FIG. 11, a communication device 1100 includes a processor 1110, a memory 1120, an Radio Frequency (RF) module 1130, a display module 1140, and a user interface module 1150.

The communication device 1100 is illustrated for convenience of the description and some modules may be omitted. Moreover, the communication device 1100 may further include necessary modules. Some modules of the communication device 1100 may be further divided into sub-modules. The processor 1100 is configured to perform operations according to the embodiments of the present invention exemplarily described with reference to the figures. Specifically, for the detailed operations of the processor 1100, reference may be made to the contents described with reference to FIGS. 1 to 10.

The memory 1120 is connected to the processor 1110 and stores operating systems, applications, program code, data, and the like. The RF module 1130 is connected to the processor 1110 and performs a function of converting a baseband signal into a radio signal or converting a radio signal into a baseband signal. For this, the RF module 1130 performs analog conversion, amplification, filtering, and frequency upconversion or inverse processes thereof. The display module 1140 is connected to the processor 1110 and displays various types of information. The display module 1140 may include, but is not limited to, a well-known element such as a Liquid Crystal Display (LCD), a Light Emitting Diode (LED), or an Organic Light Emitting Diode (OLED). The user interface module 1150 is connected to the processor 1110 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for performing retransmission to a network at a user equipment in a wireless communication system has been described centering on an example applied to the 3GPP LTE system, the present invention is applicable to a variety of wireless communication systems in addition to the 3GPP LTE system.

The invention claimed is:

1. A method for processing a signal at a user equipment in a wireless communication system, the method comprising:
   receiving, by the user equipment, from a source cell, a handover command including information on an operating band of a target cell, the information comprising an EARFCN (Evolved Universal Terrestrial Radio Access Absolute Radio Frequency Channel Number) of the target cell;
   determining, by the user equipment, whether the carrier frequency of the target cell can be calculated based on the received information; and
   when the carrier frequency of the target cell cannot be calculated based on the received information, configuring the target cell as a barred cell.

2. The method of claim 1, wherein the carrier frequency of the target cell is a carrier frequency corresponding to the operating band of the target cell or to at least one overlapping band of the operating band of the target cell.

3. The method of claim 1, further comprising:
   when the carrier frequency of the target cell is calculated based on the information on the operating band of the target cell, performing a handover procedure to the target cell.

4. The method of claim 1, further comprising:
   performing a connection reestablishment procedure with a network when the carrier frequency of the target cell is not calculated based on the information on the operating band of the target cell.

5. The method of claim 4, wherein performing the connection reestablishment procedure comprises:
   performing a cell selecting procedure to select other cell;
   receiving system information including information on an operating band of the other cell; and
   when a carrier frequency of the other cell is calculated based on the information on the operating band of the other cell, performing a handover procedure to the other cell.

6. The method of claim 5, wherein the carrier frequency of the other cell is a carrier frequency corresponding to the band of the other cell or to at least one overlapping band of the operating band of the other cell.

7. The method of claim 5, wherein the information on the operating band of the target cell is an EARFCN (Evolved Universal Terrestrial Radio Access Absolute Radio Frequency Channel Number) of the target cell.

8. A method for processing a signal at a user equipment in a wireless communication system, the method comprising:
   transmitting user equipment capability information to a network, wherein the user equipment capability information allows the network to determine whether the UE can calculate a carrier frequency based on operating band information from the network, the information comprising an EARFCN (Evolved Universal Terrestrial Radio Access Absolute Radio Frequency Channel Number) of the target cell;
   receiving a handover command from the network that is based on whether the UE can calculate a carrier frequency of a target cell; and
   establishing a connection with the target cell in response to the handover command, wherein the operating band of the target cell is supported by the user equipment as indicated by the user equipment capability information.

9. The method of claim 8, wherein the information on the capability of the user equipment includes information on a lastly defined band of the supporting band and the at least one overlapping band of the supporting band.

* * * * *